May 17, 1932.  C. PAULSON  1,859,047
APPARATUS FOR DETERMINING INDICATIONS OF MEASURING
INSTRUMENTS AND CONTROLLING APPARATUS THEREBY
Original Filed April 30, 1929
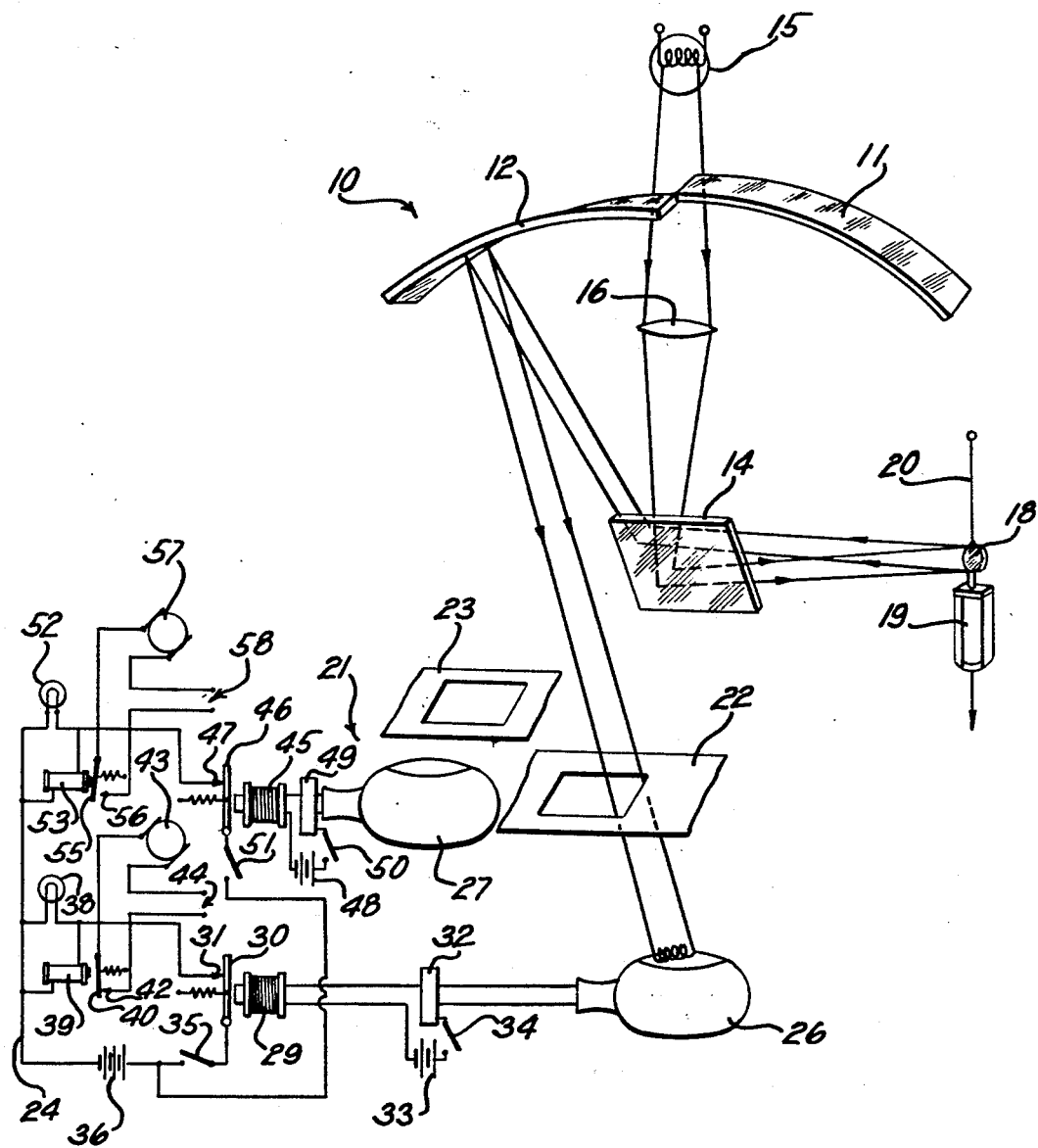
Inventor
Christian Paulson
By [signature] Att'y.

Patented May 17, 1932

1,859,047

UNITED STATES PATENT OFFICE

CHRISTIAN PAULSON, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR DETERMINING INDICATIONS OF MEASURING INSTRUMENTS AND CONTROLLING APPARATUS THEREBY

Application filed April 30, 1929, Serial No. 359,338. Renewed November 27, 1931.

This invention relates to apparatus for determining indications of measuring instruments and controlling apparatus thereby, and more particularly to apparatus for determining the indications of measuring instruments of the type known as reflecting galvanometers, and controlling apparatus thereby.

Heretofore, in determining characteristics of materials with the aid of a galvanometer, it has been a practice in some instances to determine the degree of deflection of the galvanometer by means of a light beam which is reflected upon a graduated scale from a mirror attached to the instrument; and in some other cases to focus a reflected light beam upon a photo-electric cell by means of which an operator may be warned in operating apparatus controlling the characteristic.

Objects of the present invention are to provide an improved apparatus for determining the indications of a reflecting galvanometer and controlling apparatus thereby, which will be facile, economical and reliable.

One embodiment of the invention contemplates the use of a controlling apparatus whereby a light beam is directed upon a galvanometer mirror and reflected therefrom by an intermediate mirror upon either of two separated curved mirrors, and thence through restricted screens on separate photoelectric cells to thereby balance or oppositely affect associated electrical circuits for controlling a characteristic indicated by the galvanometer.

It is believed the invention will be more fully understood by referring to the following description read in connection with the accompanying drawing, in which The figure represents a fragmentary schematic view in perspective, of an apparatus embodying the features of the invention.

Referring to the drawing, an indication determining and control apparatus generally denoted by the numeral 10, comprises a right curved mirror 11, and a left curved mirror 12. Equi-distant from the ends of the mirrors and located beneath them at a point coinciding with the mid point of an imaginary circle of the circumference of which the curved mirrors may form segments, a stationary deflecting mirror 14 is secured by any suitable means (not shown). Above and to the rear of the curved mirrors 11 and 12 is an incandescent lamp 15 which is shown connected to a power line of any suitable voltage, and so positioned that the beams cast thereby fall to the rear of the curved mirrors, pass through a suitable condensing lens 16, and are focused upon the stationary deflecting mirror 14. The deflecting mirror is tilted at such an angle as to deflect the beam cast thereinto from the lens 16 onto a reflecting mirror 18, of a conventional suspended type galvanometer 19, the mirror 18 being mounted upon and revolvable with the galvanometer thread 20 in response to electrical impulses sensed by the galvanometer.

A control system, generally denoted by the numeral 21 is provided in connection with the above described apparatus and comprises opaque screens 22 and 23, each being provided with rectangular slots. The system 21 also includes a circuit 24, which is designed to be regulated by the effect upon a pair of photo-electric cells 26 and 27 of a light beam which may be projected upon either of the photoelectric cells through the slotted screens 22 and 23 respectively. The photoelectric cell 26 is connected to a relay 29, having an armature 30 and a contact 31, by a circuit which includes a suitable amplifying circuit 32, a battery or other suitable source of electrical energy 33 and a switch 34. Associated with the photoelectric cell 26 is an auxiliary circuit having connected thereto in series a switch 35 and a battery or other suitable source of electrical energy 36; and in parallel relation with respect to each other a lamp or other suitable signal 38, and a relay 39, the latter having an armature 40 and a contact 42. The armature 40 and the contact 42 of the relay 39 are connected with a motor or other suitable direct-control means 43 by which is operated a valve (not shown) for increasing the supply of heat or fuel furnished to a conventional type of annealing furnace (not shown). The photoelectric cell 27 is connected to a relay 45, having an armature 46 and a contact 47, by a circuit which includes a battery or other suitable source of electrical energy 48, a suitable amplifying circuit 49, and a switch 50. Associated with the photoelectric cell 27 is an auxiliary circuit which is also connected with the battery 36 and includes a switch 51 and, in parallel relation with respect to each other a lamp or other suitable signal 52 and a relay 53, the latter having an armature 55 and a contact 56. The armature 55 and the contact 56 of the relay 53 are connected with a motor or other suitable direct-control means 57, by means of which the above mentioned valve (not shown) is operated for reducing the supply of heat or fuel furnished to the furnace. The members 43 and 57 are connected to opposite ends of the same valve shaft, one motor rotating the valve open and the other closing it.

In practicing the invention for the purpose of determining and controlling heat conditions within the annealing furnace, wherein it is desired to maintain a temperature within selected limits, the galvanometer 19 is connected to a suitable thermo-sensitive unit (not shown), which, being subjected to the temperature prevailing within the annealing furnace, as the temperature varies impresses upon the galvanometer 19 impulses which cause the galvanometer to swing to the right in accordance with the increase in temperature, or to the left, as the temperature may decrease. The thermo-sensitive unit, as is well understood in the temperature control art, usually consists of a thermocouple which is directly connected to the suspended portion 19 of the galvanometer to actuate it as heat generates current in the thermocouple.

The respective auxiliary circuits associated with the photoelectric cells are first closed by means of the switches 35 and 51, thus illuminating the signal lamps 38 and 52. The lamp 15 is lighted, the beam of light therefrom is reflected from the galvanometer mirror 18 to the deflecting mirror 14, thence to the concave surface of the curved mirror 11 through the slotted screen 23, and projected upon the photoelectric cell 27. The cell 27, being light sensitive, is affected thereby to energize the relay 45, which attracts the armature 46, opening the connection with the contact 47, opening the circuit and extinguishing the signal lamp 52. Concurrently, the relay 53 is de-energized, releasing the armature 55, which closes with the contact 56 to complete the circuit embracing the direct control means 57. The signal lamp 38 remains illuminated to indicate to an operator that the temperature within the furnace is yet below the desired minimum. As the temperature is increased due to the action of the direct control means 57, the thermostatically controlled galvanometer 19 swings to the right in accordance with the increase in temperature until the minimum limit of the permissible range of temperature is exceeded. In the drawing, the photoelectric cells 26 and 27 are shown separated a distance equivalent to the combined length of the curved mirrors 11 and 12. This distance obviously may be varied as it is desired to increase or decrease the permissible range of temperature being measured. The beam deflected from the mirror 14 moves leftwardly across the curved mirror 11, and the beam projected therefrom is swung away from the slot in the screen 23 and from the photoelectric cell 27, and the relay 45 is consequently de-energized, releasing the armature 46 which closes the circuit and illuminates the signal lamp 52. Accordingly it may be seen that as soon as the minimum limit is passed in the upward trend, both the signal lamps 52 and 38 are illuminated, indicating to the operator that a satisfactory temperature is being maintained within the furnace.

As the temperature increases beyond its minimum limit, there is a tendency for it to continue to increase. In such a case, the galvanometer 19 moves more pronouncedly to the right, causing the deflecting mirror 14 to cast the beam upon the curved mirror 12, which in turn projects the beam through the slotted screen 22 upon the photoelectric cell 26. The relay 29 is energized thereby and attracts the armature 30, opening its connection with the contact 31 and extinguishing the lamp 38. At the same time, the relay 39 is de-energized and the armature 40 is released therefrom to engage the contact 42, with the result that the circuit is established to actuate the valve-operating means 43 to reduce the supply of heat to the furnace. When this is accomplished, the beam will eventually retrace its path, leaving the photoelectric cell 26 and hovering between it and the cell 27 until the temperature within the furnace has dropped below the minimum limit, when it will once more be played upon the latter photoelectric cell, for the purpose of again increasing the supply of heat to the furnace.

From the foregoing it will be observed that, for the purpose of accurately determining the duration of a heat treatment at the specified temperature, it is only necessary for the operator to note the periods during which the signal lamps 38 and 52 are simultaneously illuminated. By means of the dual photoelectric cell controlled system, the temperature within the furnace is maintained constantly within the desired range, and any tendency to depart therefrom is immediately corrected without the services of an attendant, by means of the auxiliary circuits controlled by the photoelectric cells.

Although the above described application of the invention is concerned with its application to the controlling of temperatures, it is obvious that it is equally advantageous in determining measurements made by many kinds of instruments where the results of the tests are attested by the deflection of a moving member, such as, for instance, thermostats, liquid level and pressure gauges, etc.

It is apparent that the invention is capable of many embodiments other than that described above and it is desired that the invention be limited only by the scope of the appended claims.

What is claimed is:

1. A control apparatus, including electrical means responsive to a condition to be controlled, reflecting means actuated by the electrical means, means for producing a beam of light, means for deflecting the beam into the reflecting means and receiving it again therefrom, reflecting means for receiving the beam as it leaves the deflecting means in one direction, a separate reflecting means for receiving the beam as it leaves the deflecting means in another direction, separate light sensitive means positioned opposite each of the two latter reflecting means to be energized by the beam as it is emitted therefrom, and means actuated by each of the light sensitive means to control the condition.

2. A control apparatus, including a suspended mirror type galvanometer responsive to a condition to be controlled, means for producing a beam of light, means for deflecting the beam into the suspended mirror and again receiving it therefrom, spaced reflecting means which receive the beam from the deflecting means and between which the beam may sway, spaced light sensitive elements positioned opposite the reflecting means for receiving the beam therefrom, and means actuated by the light sensitive elements to control the condition.

3. A control apparatus, including a suspended mirror type galvanometer responsive to a condition to be controlled, means for producing a beam of light, means for deflecting the beam into the suspended mirror and again receiving it therefrom, a pair of spaced curved mirrors for receiving the beam from the deflecting means and between which the beam may sway, a pair of light sensitive elements positioned at the focus of the curved mirrors to be energized by the beam as it is alternately reflected therefrom, and means connected to the light sensitive elements for controlling the condition.

4. A control apparatus, including a suspended mirror type galvanometer responsive to a condition to be controlled, means for producing a beam of light, means for deflecting the beam into the suspended mirror and again receiving it therefrom, a pair of spaced curved mirrors for receiving the beam from the deflecting mirror and between which the beam may sway, a pair of spaced, slotted members positioned at the focus of the curved mirrors, a photo-electric cell positioned beneath the slot of each slotted member to receive the beam as it is alternately reflected from the curved mirrors, and relay members connected to each of the photo-electric cells to control the condition.

5. A temperature control apparatus, including a suspended mirror type galvanometer responsive to temperature to be controlled, means for producing a beam of light, means for deflecting the beam into the suspended mirror and again receiving it therefrom, a pair of spaced curved mirrors for receiving the beam from the deflecting means and between which the beam may sway, a pair of spaced slotted members positioned in focus of the curved mirrors, a pair of spaced photo-electric cells positioned underneath the slots of the slotted members to receive the beam as it is alternately reflected from the curved mirrors, a pair of relays connected to the photo-electric cells and actuatable thereby, and power means controlled by the relays to control the temperature.

In witness whereof, I hereunto subscribe my name this 20 day of April A. D., 1929.

CHRISTIAN PAULSON.